United States Patent
Piazza et al.

(10) Patent No.: US 6,639,598 B2
(45) Date of Patent: *Oct. 28, 2003

(54) METHOD AND APPARATUS FOR EFFECTIVE LEVEL OF DETAIL SELECTION

(75) Inventors: Thomas A. Piazza, Granite Bay, CA (US); Michael Mantor, Orlando, FL (US); Ralph Clayton Taylor, Deland, FL (US); Val Gene Cook, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 09/735,037

(22) Filed: Dec. 12, 2000

(65) Prior Publication Data

US 2001/0020948 A1 Sep. 13, 2001

Related U.S. Application Data

(63) Continuation of application No. 09/061,383, filed on Apr. 16, 1998, now Pat. No. 6,204,857.

(51) Int. Cl.$^7$ .............................................. G06T 17/00
(52) U.S. Cl. ....................... 345/428; 345/582; 345/587; 345/589; 345/606; 345/607
(58) Field of Search ................................ 345/581, 582, 345/587, 606, 589, 593, 607, 608, 609, 428

(56) References Cited

U.S. PATENT DOCUMENTS

| | | |
|---|---|---|
| 4,692,880 A | 9/1987 | Bunker et al. |
| 4,727,365 A | 2/1988 | Merz et al. |
| 4,811,245 A | 3/1989 | Bunker et al. |
| 5,544,292 A | 8/1996 | Winser |
| 5,719,600 A | 2/1998 | Alcorn |
| 5,892,516 A | 4/1999 | Alexander |
| 5,953,015 A * | 9/1999 | Choi ........................... 345/428 |
| 5,986,663 A * | 11/1999 | Wilde ......................... 345/428 |

OTHER PUBLICATIONS

Lance Williams, Pyramidal Parametrics, Computer Graphics, 1983, vol. 17, No. 3, pp. 1–11.
Paul S. Heckbert, Survey of Texture Mapping, Graphics Interface '86, pp. 207–212.
Paul S. Heckbert, Survey of Texture Mapping, IEEE CG & A, pp. 56–67.

* cited by examiner

Primary Examiner—Mark Zimmerman
Assistant Examiner—Kimbinh T. Nguyen
(74) Attorney, Agent, or Firm—Scully, Scott, Murphy & Presser

(57) ABSTRACT

Method and apparatus for rendering texture to an object to be displayed on a pixel screen display. This technique makes use of linear interpolation between perspectively correct texture address to calculate rates of change of individual texture addresses components to determine a selection of the correct LOD map to use and intermediate texture addresses for pixels of the object between the perspectively correct addresses. The method first determines perspectively correct texture address values associated with four corners of a predefined span or grid of pixels. Then, a linear interpolation technique is implemented to calculate a rate of change of texture address components in the screen x and y directions for pixels between the perspectively bound span corners. This linear interpolation technique is performed in both screen directions to thereby create a potentially unique level of detail value for each pixel, which is then used as an index to select the correct pre-filtered LOD texture map. When mapping an individually determined LOD value per pixel, the effect of producing undesirable artifacts that may appear if a single LOD for an entire span or polygon is used, is obviated.

23 Claims, 8 Drawing Sheets

METHOD AND APPARATUS FOR EFFECTIVE LEVEL OF DETAIL SELECTION

This application is a continuation of application Ser. No. 09/061,383, filed Apr. 16, 1998, now U.S. Pat. No. 6,204,857.

FIELD OF THE INVENTION

This invention relates to real-time computer image generation systems and, more particularly, to means and method for selecting effectively an appropriate level of detail (LOD) of stored information for representing an object to be displayed.

BACKGROUND OF THE INVENTION

In certain real-time computer image generation systems, objects to be displayed are represented by convex polygons which may include texture information for rendering a more realistic image. The texture information is typically stored in a plurality of two-dimensional texture maps, with each texture map containing texture information at a predetermined level of detail ("LOD") with each coarser LOD derived from a finer one by filtering as is known in the art. Further details regarding computer image generation and texturing, can be found in U.S. Pat. No. 4,727,365, U.S. Pat. No. 4,811,245 and U.S. Pat. No. 4,692,880 which are incorporated herein in their entirety by reference thereto.

Selection of the most appropriate LOD for obtaining texture for polygons representing an object requires consideration of the apparent distance of the object from a viewpoint and the angle between a vector from the viewpoint to a pixel on the polygon and the normal vector of the polygon. These two factors determine the size of the projected pixel footprint in the texture space. As the polygon moves further away from the viewpoint the footprint will decrease in size, or as it moves closer it will increase in size on the polygon. Also the angle between the view ray and the polygon normal will give a measure of how "edge on" the polygon is. As the polygon becomes more edge on in a direction the footprint will grow in size along that dimension. When moving from screen pixel to screen pixel the texture coordinate rate of change will continue to change. This non-linear relationship is why perspective mapping in necessary. The u and v texture coordinates are not linear in screen space as soon as the polygon is not perpendicular to the viewer.

Some prior art techniques had resolved to calculate an LOD value per polygon which only allowed one LOD of a map per polygon. Sometimes polygons are sub-divided (tesselated) to obtain more than one LOD per polygon. While this works well for pixels that project into polygons that are perpendicular to the viewer, texture mapping for perspective projections requires further incremental calculation techniques to generate accurate texture addresses on a per pixel basis. Such texture mapping techniques in perspective requires the calculation of texture address partial derivatives or delta values which are used to determine the appropriate LOD for texture mapping and described mathematically as:

$$\frac{\partial u}{\partial x}, \frac{\partial u}{\partial y}, \frac{\partial v}{\partial x}, \frac{\partial v}{\partial y}$$

These values represent the rate of change of the U and V texture addresses with respect to one pixel change in the X or Y pixel directions on a computer display screen. Intuitively, the magnitude of each term describes the distance covered in the finest LOD level of the texture map by the projection of a pixel onto the surface of a textured polygon in the specified direction. In other words, when progressing from one pixel to the next neighboring pixel in screen X space, dU/dX is measure of how much U changes in the texture map. Another way to think of these terms is that the larger the magnitude of the term the more compressed the texture is in the specified direction. If a high frequency signal, such as a compressed texture address, is point sampled at a lower frequency, such as the pixel centers on the screen, aliasing can result. This aliasing produces undesirable visual anomalies such as scintillation or "texture swimming", where the texture pattern appears to float around on the top of a polygon when in motion. By pre-filtering the texture images into multiple LODs the unwanted visual artifacts can be avoided. The above terms are used to select the texture image which has the appropriate amount of filtering applied on a pixel-by-pixel basis. The term with the largest rate of change should dominate the LOD selection criteria, otherwise the sampled texture in that direction may scintillate. This approach generally minimizes visual artifacts at the expense of blurring the resulting image in other directions. A simple maximum of all four gradient terms however, is not sufficient because the magnitude of the terms can change as the polygon rotates and effectively select a different LOD for the same pixel, depending on the orientation of the polygon. One approach for reducing this problem has been proposed as set forth by Paul Heckbert's Master's Thesis, University of California, Berkeley, June 1989 which sets forth an LOD calculation in accordance with equation (1) as follows:

$$LOD_{Heckbert} = \log_2\left[\max\left[\sqrt{\left(\frac{\partial u}{\partial x}\right)^2 + \left(\frac{\partial v}{\partial x}\right)^2}, \sqrt{\left(\frac{\partial u}{\partial y}\right)^2 + \left(\frac{\partial v}{\partial y}\right)^2}\right]\right] \quad (1)$$

Techniques have been implemented to approximate such texture address partial derivatives, however, they have proven to be very computer resource intensive, requiring many floating point operations which are often difficult and impractical to implement in real-time, 3-D computer graphics applications.

Thus, it would be highly desirable to provide a method for generating instantaneous texture address values used to calculate an LOD on a per pixel basis, in real-time, that requires minimum operations and results in a visually effective texture mapped perspective object.

SUMMARY OF THE INVENTION

In accordance with the present invention, the rate of change of texture addresses when mapped to individual pixels of a polygon is used to obtain the correct level of detail (LOD) map from a set of pre-filtered maps. The method comprises a first determination of perspectively correct texture address values found at four corners of a predefined span or grid of pixels. Then, a linear interpolation technique is implemented to calculate a rate of change of texture addresses for pixels between the perspectively bound span corners. This linear interpolation technique is performed in both screen directions to thereby create a potentially unique level of detail value for each pixel. When mapping an individually determined LOD value per pixel, the effect of producing undesirable artifacts, such as "Shark teeth", that may appear if a single LOD for an entire span is used, is virtually obviated.

Each pixel of a span is assigned an independently interpolated value from the horizontal and vertical direction of the screen. Since the u and v gradients are monotonic, linear interpolation of the rate of change of each gradient will allow a LOD change in the u or v gradient direction at any pixel, and once the gradient has moved on to a new LOD, it will continue on in that LOD until it gets to the next LOD. Although the LOD assignments to pixels other than those at the corners of the span may represent a non-perspective correct interpolation within a span due to linear interpolation of a non-linear function, the resulting image to be displayed is acceptable generally to the human eye for most practical applications.

The rate of change of a coordinate from a two dimensional texture map when applied to a rendered polygon (i.e. a polygon to be displayed) is approximated between regularly spaced perspectively correct address values (i.e. those obtained from pixels situated at the corners of a span) in order to determine the appropriate Level of Detail (LOD) for proper texture mapping. This allows a form of linear interpolation between small areas in screen space to be used without obtaining artifacts from linear interpolation and prevents the need of subdividing polygons to very small polygons, as an alternative, to avoid distortions to non-perspective correct mapping of textures and corresponding increased demand for computing resources. This method of the present invention reduces the hardware necessary to obtain an image that appears perspectively correct to the human eye.

The various features of novelty which characterize the invention are pointed out with particularity in the claims annexed to and forming a part of the disclosure. For a better understanding of the invention, its operating advantages, and specific objects attained by its use, reference should be made to the drawings and descriptive matter in which there are illustrated and described preferred embodiments of the invention.

DETAILED DESCRIPTION OF THE INVENTION

The present invention is directed to a method for discretely generating texture address partial derivatives or delta values which are used to determine the appropriate LOD for texture mapping on a per-pixel basis. The generated texture address partial derivatives can then substituted in the Heckbert equation (1) for determining the LOD for each pixel to be mapped.

Particularly, in the method of the invention, a span of a predetermined number of pixels is defined in pixel (screen space). As described, the designators x and y represent the row (x) and column (y) designation of a pixel (picture element) from a plurality or matrix of pixels of a screen or display device. The pixels of the display device are typically rectangular or square and arranged in horizontal rows and vertical columns for convenience. In the preferred embodiment, the predefined span includes a grid of 4×4 pixels. Then, a perspectively correct determination of the texture value (u,v) is made at each of four corners of the span, three of the corners being immediately outside the span. As used herein, the designators u and v represent the row (u) and column (v) designation of a texel (texture element or cell) from a plurality of texels of a texture map at a particular LOD. Texels may also be square or rectangular and envisioned to be located in horizontal rows and vertical columns. Then, a linear interpolation technique is performed to approximate the texture values and partial derivatives of texture addresses of each pixel within the span that map to the polygon to be rendered.

Figure 1A:
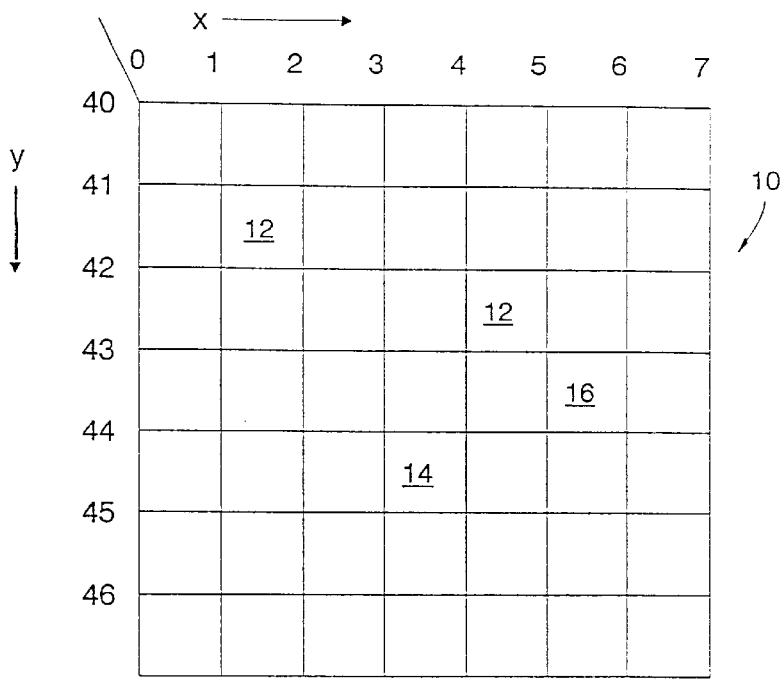
FIG. 1(a) illustrates a pixel space defining screen coordinates (x,y) on a computer screen display.

The invention will now be described in greater detail. FIG. 1(a) represents a portion of a display device or screen 10, having a plurality of square or rectangular pixels, several representative ones of which are designated by reference numeral 12 arranged in a matrix having rows and columns is shown. A pixel may be identified to be located in a row I and column J by specifying an X, Y coordinate pair corresponding to a predetermined reference designator, such as its center. For example, pixel 14 is found by designating location (3, 5) while pixel 16 is at (5, 3). Other convenient reference points, such as the corners of the pixel, may be used if desired for addressing purposes. Further, if a corner is selected as a reference designator for a pixel, then appropriate one-half pixel values may have to be considered to accommodate offset from the center of the pixel as is known in the art.

Figure 1B:
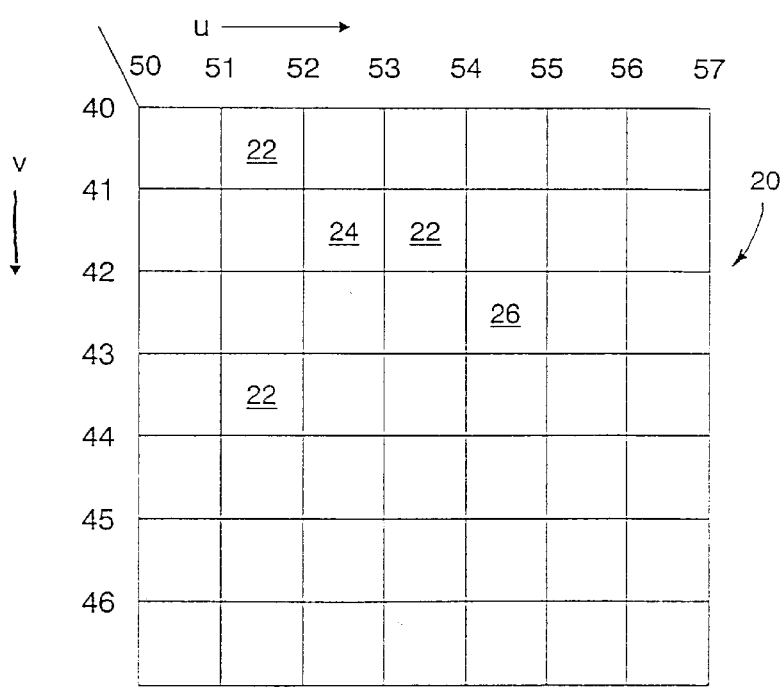
FIG. 1(b) illustrates a texture space defining texture address coordinates (u,v) located on one or more pre-filtered texture maps indexed by a level of detail value.

Referring to FIG. 1(b), a portion of a texture map 20 at a predetermined level of detail (LOD) having a plurality of square or rectangular texels or cells, several representative ones of which are designated by reference numeral 22 arranged in a matrix having rows and columns is shown. A texel may be identified to be located in a row U and column V by specifying a U, V coordinate pair corresponding to its upper left hand corner. For example, texel 24 is found by designating location (52, 41) while texel 26 is found by designating location (54, 42). Other convenient reference points, such as different corners or the center of the texel, may be used if desired for addressing purposes.

Figure 2:
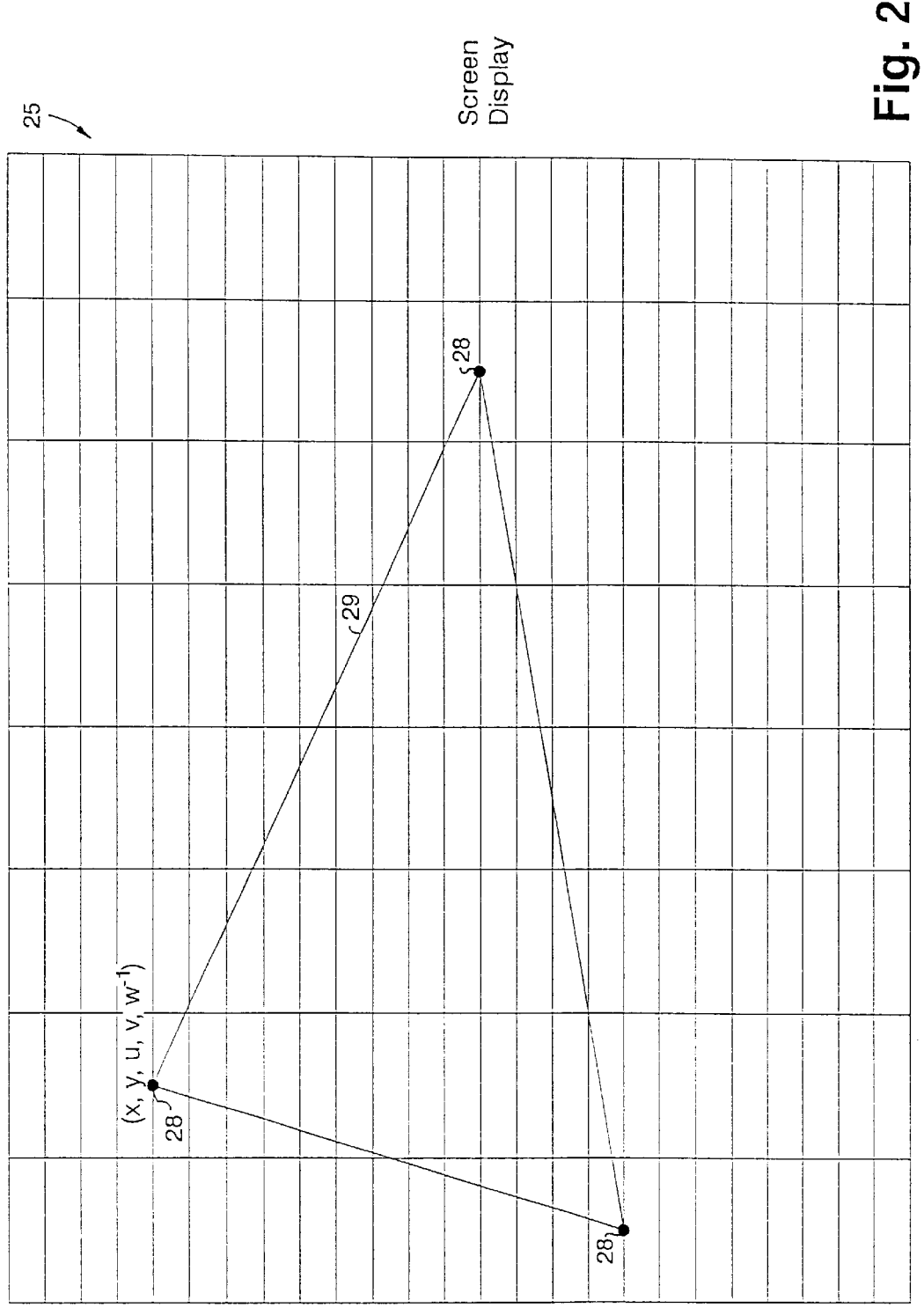
FIG. 2 illustrates a polygonal object located in pixel space to be rendered with texture.

FIG. 2 illustrates a screen display 25 providing a polygonal object 29 to be texture mapped with the object having vertices 28. As is known, when mapping texture space to screen space, the texture address cannot be linearly interpolated, but, as shown in FIG. 2, if the U and V addresses and the range W at the vertices of the polygon are known along with the screen X,Y location of the vertices as is the case with a three dimension rendering system, then the U and V coordinates when divided by W become linear with respect to screen space. Thus, at a vertex, (S,T) can be found with equations 2(a) and 2(b) and linearly interpolated to any pixel in the screen. Likewise, 1/W can also be linearly interpolated to any pixel in the screen.

$$S = U/W \qquad (2(a))$$

$$T = V/W \qquad (2(b))$$

where 1/W is the inverse range distance from an observer location to the object in pixel space. Now, as know in the art, with three vertices that are known to be in a plane and attribute data S,T, 1/W ($W^1$), a set of plane equations can be determined that specify S, T, $W^{-1}$ as a function of screen X and Y as set forth in equations 3(a)–3(c) as follows:

$$S = Co + X^*Cxs + Y^*Cys \qquad 3(a)$$

$$T = Cot + X^*Cxt + Y^*Cyt \qquad 3(b)$$

$$W^{-1} = CoW^{-1} + X^*CxW^{-1} + Y^*CyW^{-1} \qquad 3(c)$$

These plane equation coefficients (Co, Cx, Cy) for each of the polygon's values S, T, and 1/W can be determined because the X,Y position and attribute data (S, T, 1/W) is given at three points and can be used to form a plane in a three dimensional space. An equation of a plane can be written as Attribute(x,y)=Co+Cx*x+Cy*y, where the Co term defines the value at some origin, in this case it will be relative to the value at the upper left corner of the span containing the top-most vertex, and Cx, Cy define the change in the attribute for a step change in the x and y directions, respectively. When this function is evaluated at some x, y, it yields the magnitude of the attribute at that x, y location.

When $\Delta x_0$, $\Delta x_1$, and $\Delta x_2$ are defined as the horizontal distances from the three vertices to a reference point (xref, yref) defined as the center of pixel in upper left corner of a span of pixels containing the top-most vertex, e.g., $\Delta x_0 = (x_0 - x_{ref})$ etc., and $\Delta y_0$, $\Delta y_1$ and $\Delta y_2$ are defined as the vertical distances from the three vertices to the reference point (xref, yref), e.g., $\Delta y_0 = (y_0 - y_{ref})$ etc., then three equations with three unknowns are obtained. The following example shows the texture 1/W address components (represented as $1/W_0$, $1/W_1$, and $1/W_2$, at the three vertices). Using the supplied 1/W attribute data from the three vertices and the (x, y) locations of the vertices, the following three equations with three unknowns can be determined for 1/W.

$$C0_1/W + Cx_1/W^*\Delta x_0 + Cy_1/W^*\Delta y_0 = 1/W_0$$

$$C0_1/W + Cx_1/W^*\Delta x_1 + Cy_1/W^*\Delta y_1 = 1/W_1$$

$$C0_1/W + Cx_1/W^*\Delta x_2 + Cy_1/W^*\Delta y_2 = 1/W_2$$

And by methods known in the art, the three equations with three unknowns can be solved and yield the following equations to represent the three unknowns in terms of given values.

$$Cx_1/W = [(y1-y2)^*1/W_0 + (y2-y0)^*1/W_1 + (y0-y1)^*1/W_2] / [x_2^*(y0-y1) + x_1^*(y2-y0) + x_2^*(y1-y2)]$$

$$Cy_1/W = [(x1-x2)^*1/W_0 + (x2-x0)^*1/W_1 + (x1-x0)^*1/W_2] / [x_2^*(y0-y1) + x_1^*(y2-y0) + x_2^*(y1-y2)]$$

$$C0_1/W = 1/W_0 - Cx_1/W^*x_0 - Cy_1/W^*y_0$$

The coefficients for S and T are determined in the same manner with the attribute values per vertex are S and T respectively. Once the coefficients have been determined, S, T and $W^{-1}$ can be interpolated to any (X,Y) pixel in the object. Then, substituting equations 3(a)–3(c) into equations 2(a) and 2(b), the U and V texture addresses can be perspective correctly determined from the following equations 3(d) and 3(e):

$$U = S/W^{-1} = \frac{(Cos + X*Cxs + Y*Cys)}{(Cow^{-1} + X*Cxw^{-1} + Y*Cyw^{-1})} \qquad 3(d)$$

$$V = T/W^{-1} = \frac{(Cot + X*Cxt + Y*Cyt)}{(Cow^{-1} + X*Cxw^{-1} + Y*Cyw^{-1})} \qquad 3(e)$$

The values of S, T, and $W^{-1}$ can be determined using 3(a), 3(b), and 3(c), respectively. Then by performing a perspective divide per pixel as described in 3(d) and 3(e), any non-linear distortion artifacts can be eliminated while calculating texture addresses U and V.

This address calculation uses large floating point resources and needs to be done for U and V on each clock that an address pair needs to be calculated.

As will be described, the method of the invention calculates perspective correct values at predefined corners of a span to effectively tessellate the object polygons without any polygon overhead, and then linear interpolate the address within the span. This minimizes the hardware necessary to calculate the perspective correct values, and allows real-time interpolation of values within the span with fixed point math without any visual artifacts. To complete the texture map address calculation, a method of determining an LOD map to select was necessary.

Figure 3A:
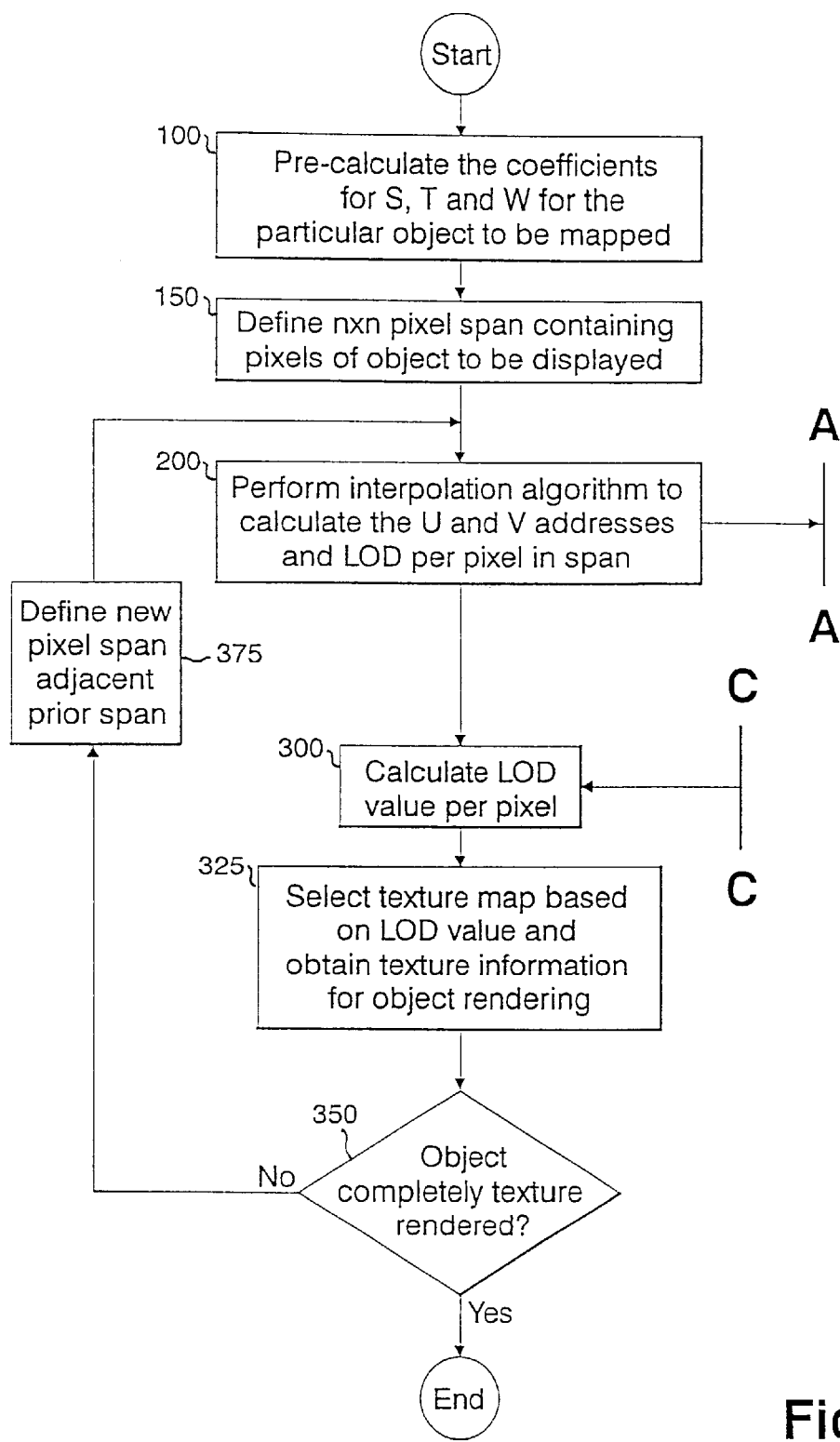
FIGS. 3(a), 3(b) and 3(c) are flow charts illustrating the methodology for calculating LOD per pixel in the texture mapping method of the invention.
Figure 3B:
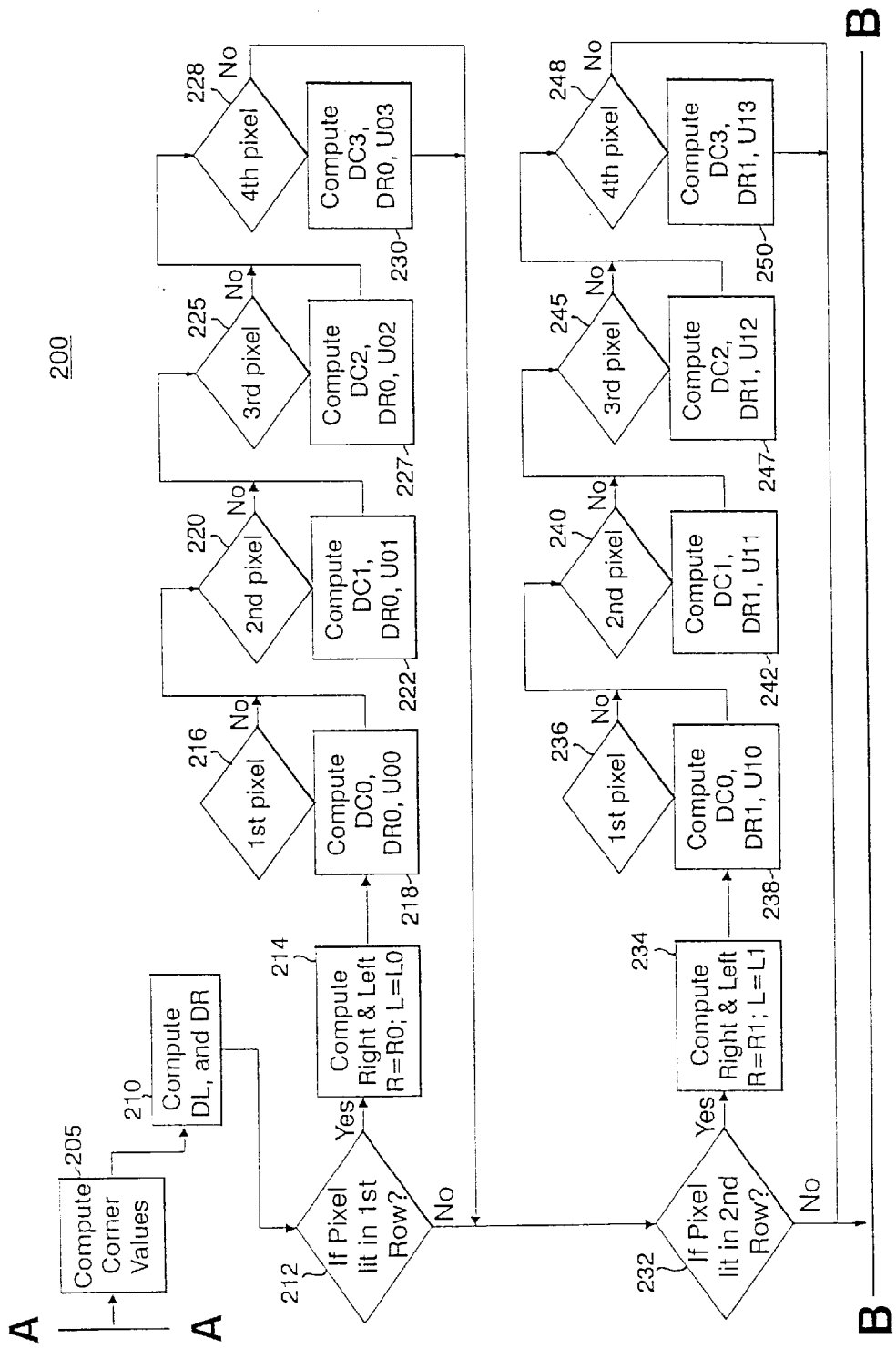
Figure 4:
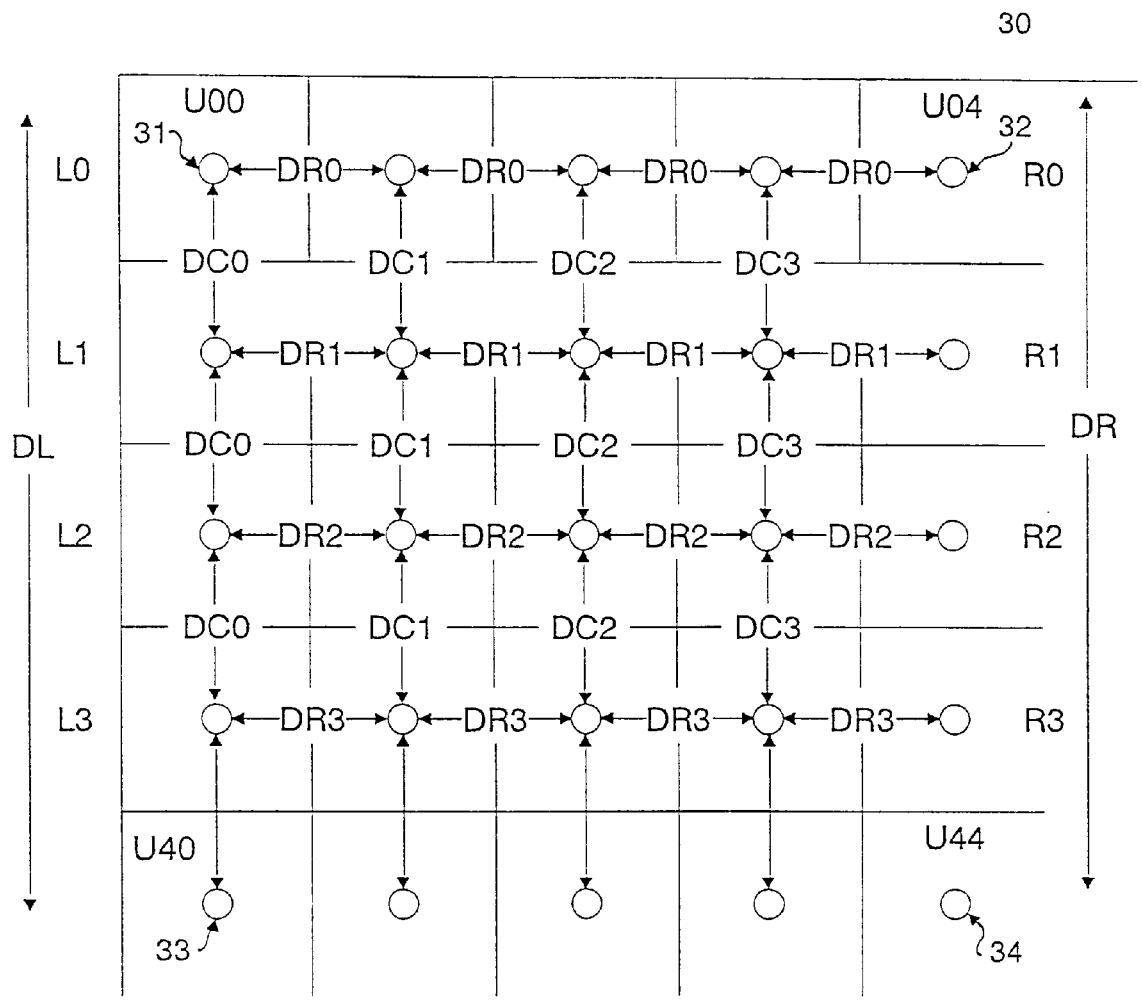
FIG. 4 illustrates a scan of pixels bounded by associated perspective correct texture addresses.

The method of the invention is now described with respect to the flow charts of FIGS. 3(a) and 3(b). In the method of the invention, the first step 100 is to pre-calculate the coefficients for S,T and $W^{-1}$ for the particular polygon to be mapped as described above with respect to equations 3(a)–3(c). These values will be used to calculate perspectively correct texture map addresses (u,v) for each corner of a given span as described according to equations 3(d) and 3(e). Next, at step 150, a span processor selects an n×n grid or span of pixels that includes one or more "lit" pixels of the object (polygon) to be textured. In the preferred embodiment, a 4×4 span of pixels 30 is chosen such as depicted in FIG. 4 which illustrates, e.g., lit pixels 38, 39 and 40, corresponding to a portion of object 29 (FIG. 2) to be texture rendered.

Each object pixel (x,y) in the pixel span will be mapped with texture information from a texture map having "u,v" orthogonal dimensions. For purposes of calculating the texture information for each pixel at the correct level of detail, texture address partials $\partial u/\partial x$ and $\partial u/\partial y$ (and $\partial v/\partial x$ and $\partial v/\partial y$) are determined for each lit(x,y) pixel in the span.

Referring back to FIG. 3(a), at step 200, the interpolation algorithm is invoked to individually determine the texture address partials $$\frac{\partial u}{\partial x}, \frac{\partial u}{\partial y}, \frac{\partial v}{\partial x}, \frac{\partial v}{\partial y}$$

and texture addresses u,v, for each lit pixel in the span whose LOD is to be determined in accordance with equation (1).

FIG. 3(b) illustrates the preferred algorithm for calculating the LOD value per pixel. As shown at step 205, FIG. 3(b), the precalculated coefficients S, T, and W for the given polygon object are first input to a span corner processor which invokes equations 3(a) through 3(e) to determine perspectively correct texture address values (u,v) at associated corners of the span, i.e., address values are calculated for pixels 31–34 shown in FIG. 4 associated with each corner of the span. For illustrative purposes, as shown in FIG. 4, each pixel x,y of the span is designated as having an address $U_{r,q}$, with "q" indicating the pixel x-coordinate (column) of the span (e.g., q=0, 1, . . . , 4) and "r" indicating the pixel y coordinate (row) of the span (e.g., r=0, 1, . . . , 4). Although not shown, an identical map is generated for the corresponding v dimension of the texture address, depicted as addresses $V_{r,q}$ with "q" indicating the pixel x-coordinate of the span (e.g., q=0, 1, . . . , 4) and "r" indicating the pixel y coordinate (e.g., r=0, 1, . . . , 4). Thus, span corner pixel 31 corresponds to texture address having u coordinate value $U_{0,0}$ (corresponding to pixel location (0,0)). Pixel 33 is shown located outside the span and having texture address value $U_{40}$. Likewise, pixel 32 is shown located outside the span and having texture address value $U_{04}$, and pixel 34 is shown outside of the span having texture address value $U_{44}$. Although not specifically shown, the description that follows for the case of calculating the $\partial u/\partial x$ and $\partial u/\partial y$ partial for each object pixel in the span readily applies to the $\partial v/\partial x$ and $\partial v/\partial y$ for each object pixel in the span. For the first span, four such texture address computations are performed, however, as will be described, as a pixel span slides across pixel space to render the object, each successive span will require the calculation of only two new perspective correct texture addresses corresponding to two new corner pixels.

Referring back to FIG. 3(b), at step 210, the perspective correct addresses at the two pixel centers 31 and 33 (FIG. 4) are input to a left vertical address interpolator to determine a vertical change, DL, (in u and v dimensions) with respect to screen direction y for pixels located along the left column (column 0) of the span 30. Similarly, the perspective correct addresses at the two pixel centers 32 and 34 are input to a right vertical address interpolator to determine a vertical change, DR, (in u and v dimensions) with respect to screen direction y for pixels along the right side of the span. From these DR and DL values, a texture address can be computed for each lit pixel in the span.

From a pixel mask (not shown), information as to the object pixels to be lit for each span are input to a series of interpolators, for example, cyclical and in a pipelined fashion. Such information is made available by a state machine controller, such as one described in co-pending U.S. patent application No.09/054,820 (Attorney Docket #11114), the contents and disclosure of which are incorporated by reference as if fully set forth herein. Thus, as indicated at step 212, FIG. 3(b), a decision is made as to whether a lit pixel resides in the first row of the span. If a lit pixel does exist in the first row of the span, then at step 214, a computation is made to determine the right and left addresses, R0 and L0. As shown in FIG. 4, L0 is equal to the given perspective correct texture address value U00, and R0 is equal to the given perspective correct texture address value U04. Next, at step 216, a determination is made as to whether the first pixel of the row is lit. If the first pixel of the row is lit, then a computation is made at step 218 to determine the horizontal texture address partial (U) calculated with respect to the x dimension ($\partial u/\partial x$) as shown in FIG. 4 as partial DR0, and, the horizontal texture address partial calculated with respect to the y dimension ($\partial u/\partial y$) as shown in FIG. 4 as partials DC0. Although not shown, vertical (V) texture address partials are calculated with respect to the x dimension to approximate the $\partial v/\partial x$ values for the subsequent pixel LOD calculation and with respect to the y dimension to approximate the $\partial v/\partial y$ values.

To calculate the texture address partial with respect to the y dimension, i.e., DC0, for the first pixel of the first row of the span, an interpolation is performed such that DC0=DL/4. All texture address partials calculated with respect to the x dimension, DR0, (e.g., $\partial u/\partial x$, $\partial v/\partial x$) for a given row of a span are identical, and thus, for the first row, an interpolation is performed such that DR0=((R0−L0)/4), with DL, DR, R0 and L0 already computed. After calculating DC0 and DR0 for the first pixel of the first row, the algorithm proceeds to step 220, FIG. 3(b).

If, at step 216, it is determined that the first pixel of the first row is not to be texture mapped, then the process continues at step 220 where a determination is made as to whether the second pixel of the first row is lit. If the second pixel of the row is lit, then an interpolation is made at step 222 to determine the texture address partial with respect to the y dimension, i.e., DC1, for the second pixel of the first row of the span, calculated as DC1=DC0+((DR−DL)/4). If DR0 was not calculated in a previous step, then the DR0 calculation DR0=((R0−L0)/4) is performed, with DR, DL, R0 and L0 already computed. Additionally, at step 222, the (u,v) texture address value is calculated, which for exemplary purposes, for the texture coordinate $U_{0,1}$ is calculated as U01=L0+((R0−L0)/4). After calculating DC1, DR0, and U01 (V01) for the second pixel of the first row, the algorithm proceeds to step 225, FIG. 3(b).

If, at step 220, it is determined that the second pixel of the first row is not to be texture mapped, then the process continues at step 225 where a determination is made as to whether the third pixel of the first row is lit. If the third pixel of the row is lit, then an interpolation is made at step 227 to determine the texture address partial with respect to the y dimension, i.e., DC2, for the third pixel of the first row of the span, calculated as DC2=DC0+((DR−DL)/2). If DR0 was not calculated in a previous step, then the DR0 calculation DR0=((R0−L0)/4) is performed, as above, with DR, DL, R0 and L0 already computed. Additionally, at step 227, the (u,v) texture address value is calculated, which for exemplary purposes, for the texture coordinate $U_{0,2}$ is calculated as U02=L0+((R0−L0)/2). After calculating DC2, DR0, and U02 (V02) for the third pixel of the first row, the algorithm proceeds to step 228, FIG. 3(b).

If, at step 225, it is determined that the third pixel of the first row is not to be texture mapped, then the process continues at step 228 where a determination is made as to whether the fourth pixel of the first row is lit. If the fourth pixel of the row is lit, then an interpolation is made at step 230 to determine the texture address partial with respect to the y dimension, i.e., DC3, for the fourth pixel of the first row of the span, calculated as DC3=DR/4−((DR−DL)/4). If DR0 was not calculated in a previous step, then the DR0 calculation DR0=((R0−L0)/4) is performed, as above, with DR, DL, R0 and L0 already computed. Additionally, at step 230, the (u,v) texture address value is calculated, which for exemplary purposes, for texture coordinate $U_{0,3}$ is calculated as U03=R0−((R0−L0)/4).

It should be understood that for each of the texture address partials DC0–DC3 and DR0 calculated at steps 218, 222, 227 and 230, concurrent operations are performed for calculating vertical (V) texture address partials with respect to the x dimension to approximate the $\partial v/\partial x$ and the $\partial v/\partial y$ values.

If, at step 212, FIG. 3(b), the pixel mask indicates that no pixel is lit in the first row of the span, or, the interpolations are already performed for any lit pixel in the first row, then the algorithm proceeds to step 232, to determine if a pixel is lit in the second row of the span. If a lit pixel does exist in the second row of the span, then at step 234, a computation is made to determine the extreme right and left addresses, R1 and L1. As shown in FIG. 4, an interpolation is performed to calculate L1=U00+DL/4 (with U00 given), and R1=U04+DR/4 (with U04 given). Next, at step 236, a determination is made as to whether the first pixel of the second row is lit. If the first pixel of the row is lit, then a computation is made at step 238 to determine the horizontal texture address partial (U) calculated with respect to the x dimension ($\partial u/\partial x$) as shown in FIG. 4 as partial DR1, and, the horizontal texture address partial calculated with respect to the y dimension ($\partial u/\partial y$) as shown in FIG. 4 as partials DC0. It should be understood that (V coordinate) texture address partials are also calculated with respect to the x dimension to approximate the $\partial v/\partial x$ values for the subsequent pixel LOD calculation and with respect to the y dimension to approximate the $\partial v/\partial y$ values.

The texture address partial with respect to the y dimension, i.e., DC0, for the first pixel of the second row of the span is calculated as described above, i.e., DC0=DL/4. All texture address partials calculated with respect to the x dimension ($\partial u/\partial x$, $\partial v/\partial x$) for each pixel of a given row are identical, and thus, for the second row, an interpolation is performed such that DR1=((R1−L1)/4), with DL, DR, R1 and L1 already computed. Additionally, at step 238, the (u,v) texture address value is calculated, which for exemplary purposes, for the texture coordinate $U_{1,0}$ is calculated as U10=L1. After calculating DC0 and DR1, and U10 (V10) for the first pixel of the second row, the algorithm proceeds to step 240, FIG. 3(*b*).

If, at step 236, it is determined that the first pixel of the second row is not to be texture mapped, then the process also continues at step 240 to determine if the second pixel of the second row is lit. If the second pixel of the second row is lit, then an interpolation is made at step 242 to determine the texture address partial with respect to the y dimension, i.e., DC1, for the second pixel of the second row of the span, calculated as DC1=DC0+((DR−DL)/4). If DR1 was not calculated in a previous step, then the DR1 calculation DR1=((R1−L1)/4), is performed, with DR, DL, R0 and L0 already computed. Additionally, at step 242, the (u,v) texture address value is calculated, which for exemplary purposes, for the texture coordinate $U_{1,1}$ is calculated as U11=L1+((R1−L1)/4). After calculating DC1, DR1, and U11 (V11) for the second pixel of the second row, the algorithm proceeds to step 245, FIG. 3(*b*).

If, at step 240, it is determined that the second pixel of the second row is not to be texture mapped, then the process continues at step 245 where a determination is made as to whether the third pixel of the second row is lit. If the third pixel of the second row is lit, then an interpolation is made at step 247 to determine the texture address partial with respect to the y dimension, i.e., DC2, for the third pixel of the second row of the span, calculated as DC2=DC0+((DR−DL)/2). If DR1 was not calculated in a previous step, then the DR1 calculation DR1=((R1−L1)/4) is performed, as above, with DR, DL, R0 and L0 already computed. Additionally, at step 247, the (u,v) texture address value is calculated, which for exemplary purposes, for the texture coordinate $U_{1,2}$ is calculated as U12=L1+((R1−L1)/2). After calculating DC2, DR1, and U12 (V12) for the third pixel of the second row, the algorithm proceeds to step 248, FIG. 3(*b*).

If, at step 245, it is determined that the third pixel of the second row is not to be texture mapped, then the process continues at step 248 where a determination is made as to whether the fourth pixel of the second row is lit. If the fourth pixel of the second row is lit, then an interpolation is made at step 250 to determine the texture address partial with respect to the y dimension, i.e., DC3, for the fourth pixel of the second row of the span, calculated as DC3=DR/4−((DR−DL)/4). If DR1 was not calculated in a previous step, then the DR1 calculation DR1=((R1−L1)/4) is performed, as above, with DR, DL, R0 and L0 already computed. Additionally, at step 250, the (u,v) texture address value is calculated, which for exemplary purposes, for texture coordinate $U_{1,3}$ is calculated as U13=R1—((R1—L1)/4).

It should be understood that for each of the texture address partials DC0–DC3 and DR1 calculated at steps 238, 242, 247 and 250, concurrent operations are performed for calculating vertical (V) texture address partials with respect to the x dimension to approximate the $\partial v/\partial x$ and with respect to the y pixel dimension to approximate the $\partial v/\partial y$ values for any lit pixel in the second row.

Figure 3C:
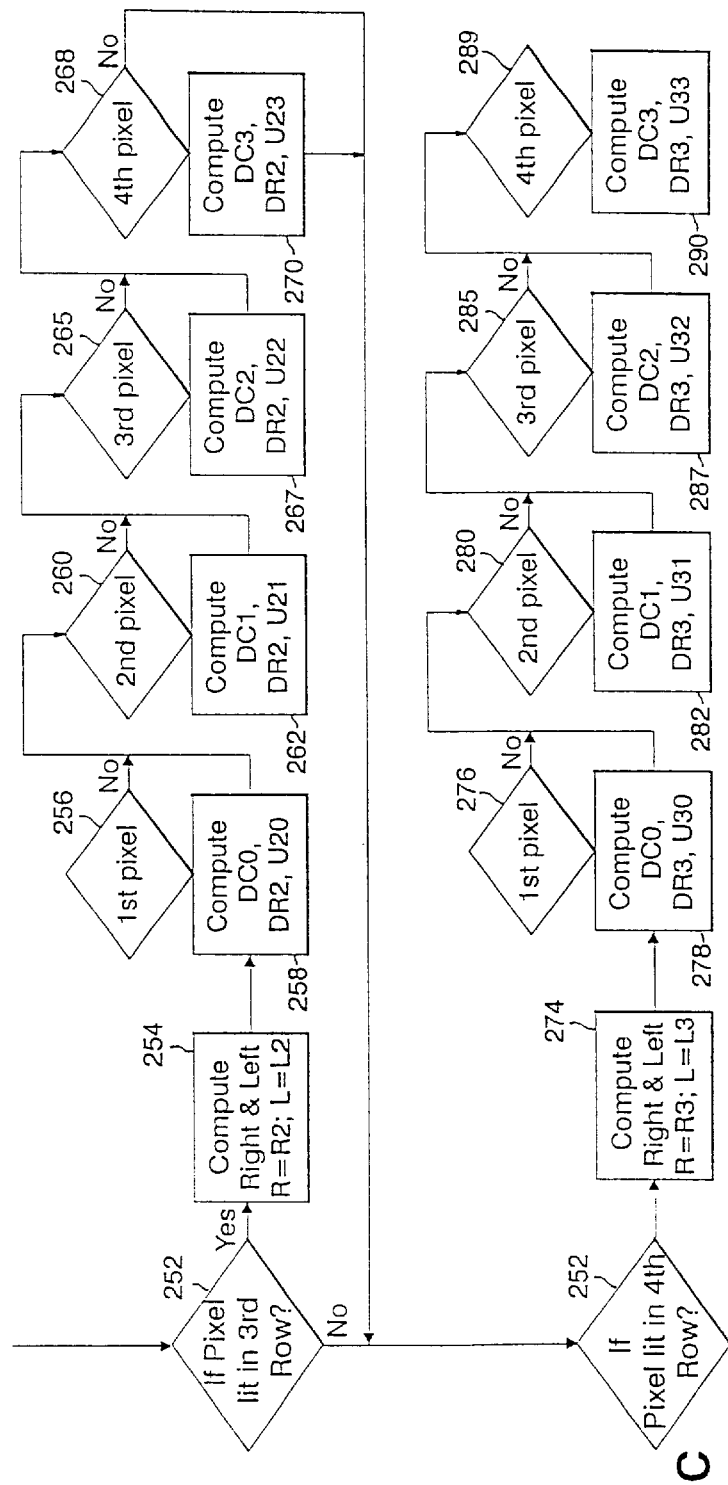

If, at step 232, FIG. 3(*b*), the pixel mask indicates that no pixel is lit in the second row of the span, or, if interpolations have already been performed for any lit pixel in the second row, then the algorithm proceeds to step 252, to determine if a pixel is lit in the third row of the span. Essentially, calculations made for the first and second row interpolations, are similarly made for each lit pixel in the third row of the span, however, for third row pixels, the texture address partials (approximating $\partial u/\partial x$, $\partial v/\partial x$) calculated with respect to the x dimension is DR2, and the texture address values are $U_{2,0}$–$U_{2,3}$. Thus, if pixels are lit in the third row of the span, then at step 254, a computation is made to determine the extreme right and left addresses, R2 and L2 with R2=U04+DR/2 and L2=U00+DL/2. At steps 256 and 258, FIG. 3(*b*), if a first pixel of the third row is to be lit, the calculation for DC0 as described above, is made, and a calculation is made to determine DR2 which is DR2=((R2−L2)/4) with R2 and L2 already computed. Additionally, at step 258, the (u,v) texture address value is calculated which for exemplary purposes, for texture coordinate $U_{2,0}$, is calculated as U20=L2.

Next, at steps 260 and 262, FIG. 3(*b*), if a second pixel of the third row is lit, the calculation for DC1 as described above, is made, and if DR2 was not calculated in a previous step, then the DR2 calculation DR2=((R2−L2)/4) is performed. Additionally, at step 262, the (u,v) texture address value is calculated, which for lit pixel $U_{2,1}$, is calculated as U21=L2+((R2−L2)/4).

Next, at steps 265 and 267, FIG. 3(*b*), if a third pixel of the third row is lit, the calculation for DC2 as described above, is made, and if DR2 was not calculated in a previous step, the DR2 calculation DR2=((R2−L2)/4) is performed. Additionally, at step 267, the (u,v) texture address value is calculated which for this lit pixel corresponds to texture coordinate $U_{2,2}$, and is calculated as U22=L2+((R2−L2)/2). Finally, at steps 268 and 270, FIG. 3(*b*), if a fourth pixel of the third row is lit, the calculation for DC3 as described above, is made, and if DR2 was not calculated in a previous step, the DR2 calculation DR2=((R2−L2)/4) is performed. Additionally, at step 270, the (u,v) texture address value is calculated which for exemplary purposes, is texture coordinate $U_{2,3}$, and calculated as U23=R2−((R2−L2)/4).

If, at step 252, FIG. 3(*b*), the pixel mask indicates that no pixel is lit in the third row of the span, or, if interpolations have already been performed for any lit pixel in the third row, then the algorithm proceeds to step 272, to determine if a pixel is lit in the fourth row of the span. Essentially, calculations made for the first, second and third row interpolations, are similarly made for each lit pixel in the fourth row of the span, however, for fourth row pixels, the texture address partials calculated with respect to the x dimension (approximating $\partial u/\partial x$, $\partial v/\partial x$) is DR3, and the texture address values are $U_{3,0}$–$U_{3,3}$. Thus, if pixels are lit in the fourth row of the span, then at step 274, a computation is made to determine the extreme right and left addresses, R3 and L3 with R3=U44−DR/4 and L3=U40−DL/4. At steps 276 and 278, FIG. 3(b), if a first pixel of the fourth row is to be lit, the calculation for DC0 as described above, is made, and a calculation is made to determine DR3 which is DR3=((R3−L3)/4) with R3 and L3 already computed. Additionally, at step 278, the (u,v) texture address value is calculated which for exemplary purposes, for texture coordinate $U_{3,0}$, is calculated as U30=L3.

Next, at steps 280 and 282, FIG. 3(b), if a second pixel of the fourth row is lit, the calculation for DC1 as described above, is made, and if DR3 was not calculated in a previous step, then the DR3 calculation DR3=((R3−L3)/4) is performed. Additionally, at step 282, the (u,v) texture address value is calculated, which for lit pixel $U_{3,1}$, is calculated as U31=L3+((R3−L3)/4).

Next, at steps 285 and 287, FIG. 3(b), if a third pixel of the fourth row is lit, the calculation for DC2 as described above, is made, and if DR3 was not calculated in a previous step, the DR3 calculation DR3=((R3−L3)/4) is performed. Additionally, at step 285, the (u,v) texture address value is calculated which for this lit pixel corresponds to texture coordinate $U_{3,2}$, and is calculated as U32=L3+((R3−L3)/2). Finally, at steps 288 and 290, FIG. 3(b), if a fourth pixel of the fourth row is lit, the calculation for DC3 as described above, is made, and if DR3 was not calculated in a previous step, the DR3 calculation is performed. Additionally, at step 290, the (u,v) texture address value is calculated which for exemplary purposes, is texture coordinate $U_{3,3}$, and calculated as U33=R3−((R3−L3)/4).

It readily follows that the LOD index computations per pixel as described with respect to FIG. 3(b), are employed to calculate the corresponding V dimension texture address partials ($\partial v/\partial x$, $\partial v/\partial y$) and texture address coordinates $V_{0,0}$–$V_{3,3}$. It should be understood that the texture address partials computations provided is for exemplary purposes only, with the exact order of computation being a design choice and not necessary limited to the order shown. For example, as dictated by a particular hardware implementation, the individual terms $$\frac{\partial u}{\partial x}, \frac{\partial u}{\partial y}, \frac{\partial v}{\partial x}, \frac{\partial v}{\partial y}$$

of these equations can be computed discretely by subtracting the address of the current pixel from the texture address of the neighboring pixels below and to the right. While horizontal delta value $\partial u/\partial x$=DR can be easily calculated by horizontal texture address interpolators, the calculation of the vertical terms, e.g., $\partial u/\partial y$=DC0−DC3 require additional hardware as the texture address interpolator can process pixels one at a time in row major order and the texture address of a pixel immediately below the current pixel may not be readily available. A gate savings is realized however, by interpolating the values of vertical terms between the extreme left and right columns, as described herein, rather than computing them directly.

From the foregoing interpolation algorithm 200 described herein with respect to FIG. 3(b), it should be understood that only the pixels that are lit in the current span are the pixels whose partials are to be determined. Referring back to FIG. 3(a), as indicated at step 300, as each set of texture address partials corresponding to each lit pixel of the current span is determined, it is fed into a LOD calculator in a pipeline fashion, which generates the level of detail index "LOD" value for the lit pixel in accordance with the Heckbert equation (equation (1)). This LOD index will determine from which texture map the address (u, v) corresponding to the lit pixel will be mapped for display on the screen, as indicated at step 325. In accordance with equation (1), an approximation may be made for each of the square root terms in accordance with the following relation shown in equation (4):

$$\sqrt{a^2 + b^2} = \max(|a|, |b|) + \frac{\min(|a|, |b|)}{2} \qquad (4)$$

where |a| represents the absolute value of "a" corresponding to the $\partial u/\partial x$ and $\partial u/\partial y$ values and |b| represents the absolute value of "b" corresponding to the $\partial v/\partial x$ and $\partial v/\partial y$ values. Although the algorithm 200 and the partial derivative approximations permits inaccuracies introduced by the linear interpolation, these are deemed to be negligible and imperceptible to the human eye for most practical applications.

Figure 5:
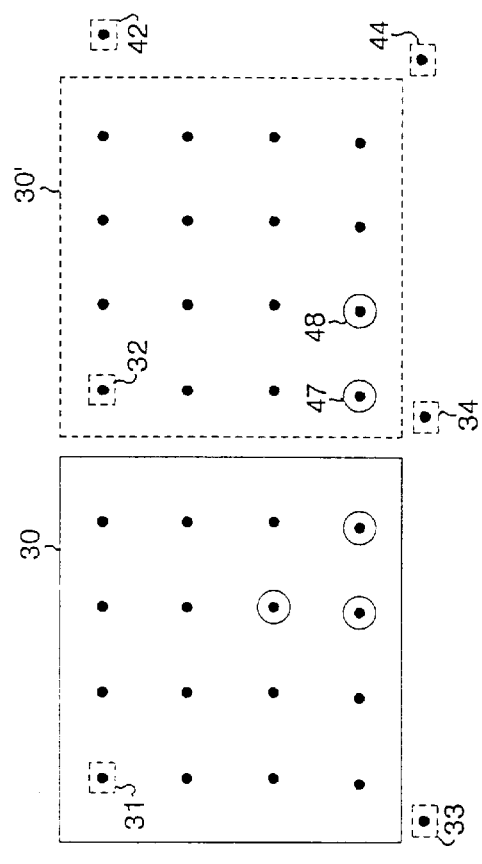
FIG. 5 illustrates a subsequent scan of pixels bounded by new associated perspective correct texture addresses.

After the LOD index values are selected and the appropriate texture map selected for the object pixels to be texture mapped, the procedure returns to step 350, FIG. 3(a), to determine if all of the pixels of the object are mapped with texture. If not, successive spans are processed until the polygonal object is completely rendered with texture in accordance with the interpolation technique described herein. Thus, if all of the object pixels are not mapped with texture, the algorithm proceeds to step 375 where the span corner processor provides the n×n span of pixels to a location adjacent the previous generated span that has lit pixels. FIG. 5 illustrates this new span 30' defined adjacent the first span 30 such that the values of the two previously calculated perspectively correct texture addresses, e.g., located at pixels 32 and 34, are retained, thus necessitating the calculation of only two new perspectively correct texture address values associated with pixels at new corners of the new span 30' as indicated at step 200, FIG. 3(a). The generation of the new span 30' is less costly because all that is required is the computation of perspectively correct texture address values for only two corners of the new span, which, in certain hardware implementations may take six (6) machine clock cycles or less. FIG. 5 illustrates the calculation of two new perspectively correct texture address values for pixels 42 and 44 associated with new corners of span 30'. It is important to note that the span processor is always preprocessing spans while the interpolation process (step 200 to step 350) is being performed on the previous span. This allows an interpolation to happen per clock.

While there are new spans left, the algorithm will proceed to step 200 where the interpolation algorithm described with respect to FIG. 3(b) is again performed, for instance, to calculate texture address partials and addresses for new lit pixels of the perspective polygon to be texture mapped, e.g., pixels 47 and 48, shown in FIG. 5.

Returning again to step 325, FIG. 3(a), if it is determined that the object is completely mapped with texture information, the level of detail of which is determined on a per pixel basis as described herein, the algorithm terminates.

Figure 6:
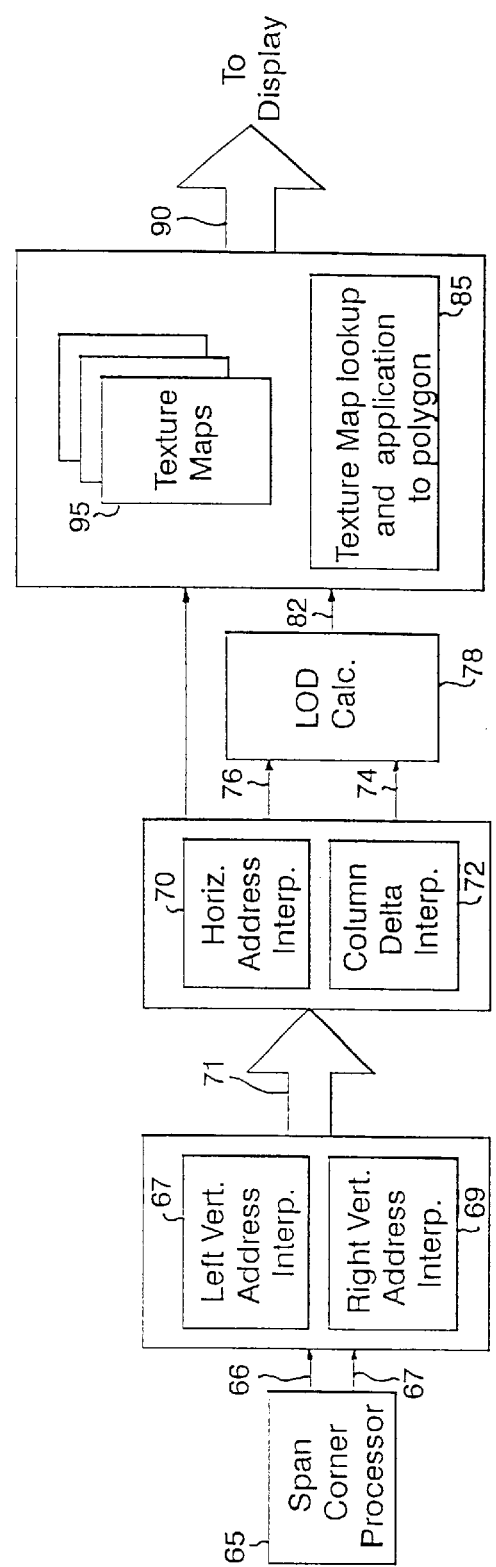
FIG. 6 illustrates conceptually a hardware architecture for implementing the algorithm of the invention texture mapping algorithm of the invention.

There are many ways in hardware to implement the method of the invention. One embodiment is illustrated conceptually in FIG. 6 which shows a span processor 65 used to generate the n×n span of pixels for each iteration and to calculate each of the perspectively correct texture values for the associated corner pixels of each span based on information of the polygon to be rendered. The information generated by the span processor 65 includes the perspective correct texture address calculations U00, U04, U40, U44 at each of the left and right columns of the span. As shown in FIG. 6, these left and right perspective correct texture addresses are input via respective lines 66, 68 to an interpolator unit which includes first vertical interpolator unit 67 for calculating left side vertical delta values DL (for U,V dimensions) and left column texture addresses L0–L3, and a concurrently operating second vertical interpolator unit 69 for calculating right side vertical delta values DR (for U,V dimensions) and right column texture addresses R0–R3 summarized herein as follows:

DL=U40−U00
DR=U44−U04
L0=U00
L1=U00+DL/4
L2=U00+DL/2
L3=U40−DL/4
R0=U04
R1=U04+DR/4
R2=U04+DR/2
R3=U4431 DR/4;

These left and right side vertical delta values DL and DR and left and right column texture addresses for the pixel to be lit in each row of the span are then input via line 71 to a second interpolator unit having a horizontal address interpolator 70 and a column delta interpolator 72 which are both employed to calculate the texture address partials (Delta u, Delta v) with respect to both horizontal (x) and vertical (y) pixel dimensions, such as described herein. Particularly, the horizontal address interpolator 70 easily calculates the following texture address partial values for any lit pixel in a span row:

DR0=((R0−L0)/4)
DR1=((R1−L1)/4)
DR2=((R2−L2)/4)
DR3=((R3−L3)/4).

The Column Delta Interpolator 72 calculates the following texture address partial values for any lit pixel in a span row:

DC0=DL/4
DC1=DC0+((DR−DL)/4)
DC2=DC0+((DR−DL)/2)
DC3=DR/4−((DR−DL)/4).

As shown in FIG. 4, from the interpolated texture addresses L0–L3 and R0–R3, the individual texture address coordinates ($U_{r,q}, V_{r,q}$) for any pixel in the span to be mapped is computed by the horizontal address and column delta interpolators. Accordingly, a summary of the computations for the texture address coordinates $U_{0,0}$–$U_{3,3}$ for lit pixel of the span 30 of FIG. 4 is provided as follows:

U00=U00 (Given)
U01=L0+((R0−L0)/4)
U02=L0+((R0−L0)/2)
U03=R0−((R0−L0)/4)
U10=L1
U11=L1+((R1−L1)/4)
U12=L1+((R1−L1)/2)
U13=R1−((R1−L1)/4)
U20=L2
U21=L2+((R2−L2)/4)
U22=L2+((R2−L2)/2)
U23=R2−((R2−L2)/4)
U30=L3
U31=L3+((R3−L3)/4)
U32=L3+((R3−L3)/2)
U33=R3−((R3−L3)/4)

Thus, the horizontal delta values DR0–DR3 and the vertical delta values DC0–DC3 are input via respective lines 74, 76 to an LOD calculator 78 which approximates the LOD index value on a per pixel basis in accordance with equations 1 and 4. Each computed texture address value and its corresponding calculated LOD index value are input via respective lines 80 and 82 to a texture map lookup and application unit 85 which maps the texture information from the appropriate texture map 95, based on the level of detail calculated for the pixel to be rendered, to each of the object pixels of the perspective polygon. The texture information is then forwarded to the computer screen display via line 90.

Figure 7:
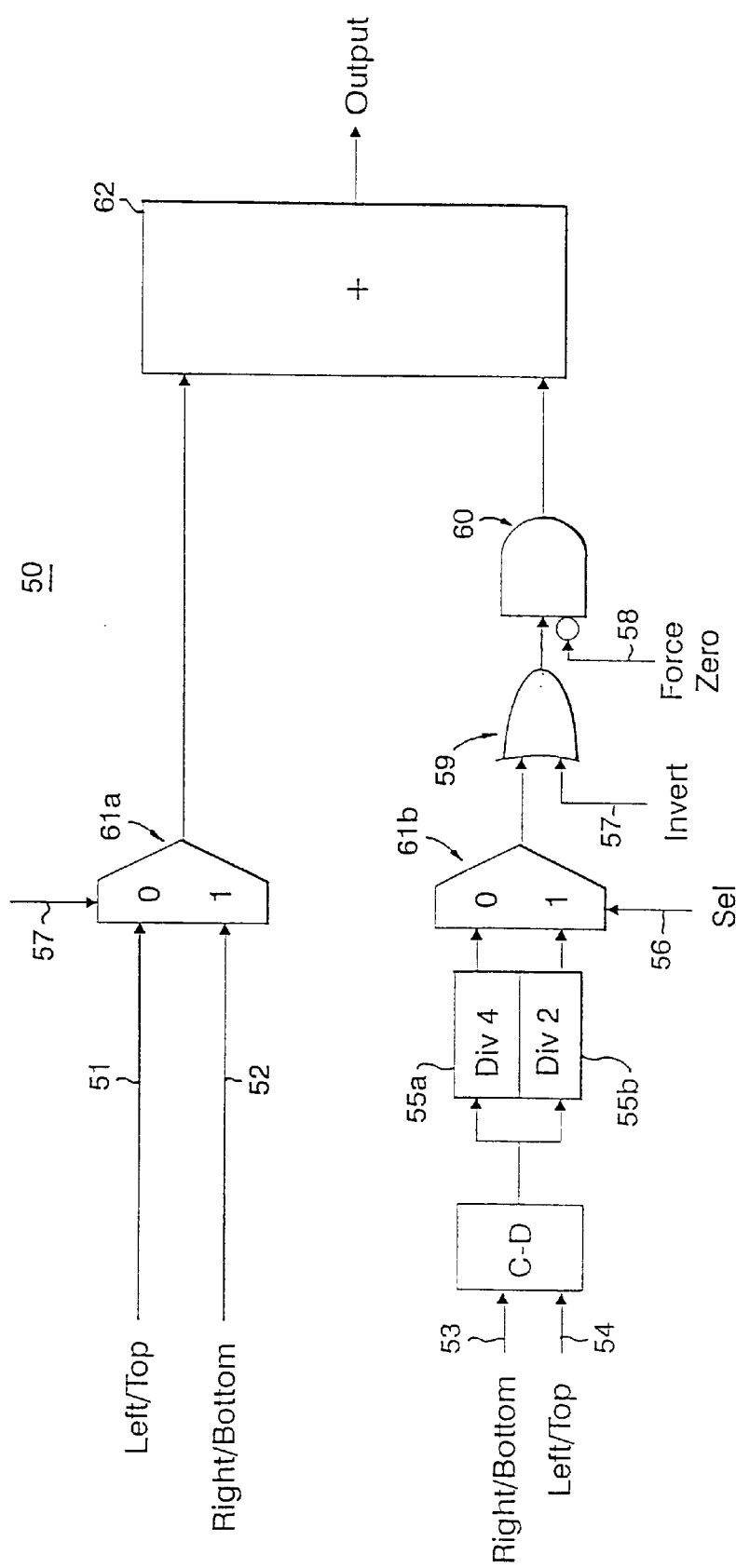
FIG. 7 is a schematic diagram of a linear interpolator used for performing the interpolations required in the invention.

A hardware schematic of a simple linear interpolator 50 for performing the interpolations of the algorithms described herein is illustrated in FIG. 7. As shown in FIG. 7, the interpolator 50 includes inputs 51–54 for the left and right values if performing a horizontal interpolation, or the top and bottom values for a vertical interpolation. The left column addresses (L0–L3) and right column addresses (R0–R3) are examples of vertical interpolation. The column delta's (DC0–DC3) and the address interpolation (Ux0–Ux3) are examples of horizontal interpolations (x=0, . . . , 3). The input select signal 56 which controls the operation of multiplexer 61b, the Invert signal 57 which controls the operation of both exclusive OR gate 59 and multiplexer 61a, and the Force Zero signal 58 which controls the NOT/AND gate 60 are used to control the interpolators to create a value that is ¼, ½, ¾ of the value between the two end values. Additionally, the 61b multiplexer will select either a divide-by-four or divide-by-two logical shift of the difference between signals at inputs 53 and 54. A truth table for the operation of the interpolator circuit 50 is shown in Table 1 as follows:

TABLE 1

| Sel | Invert | Force Zero | Output |
|---|---|---|---|
| 0 | x | 1 | Left/Top |
| 0 | 0 | 0 | Left/Top + ((Right/Bottom − Left/Top)/4) |
| 1 | 0 | 0 | Left/Top + ((Right/Bottom − Left/Top)/2) |
| 0 | 1 | 0 | Right bottom − ((Right/Bottom − Left/Top)/4) |

For instance, to calculate the address U10, the input L1 would be input, and the force zero signal 58 will be set to logic 1 to prevent influence of the signals 53 and 54 at the output of adder element 62. To calculate U13, however, the invert signal 57 will be set to logic 1 to control the inverter 59 and mux 61a to enable subtraction of the term ((R1−L1)/4) from the value R1.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method of real-time generation of texture mapped objects on a screen display, each said object to be rendered in accordance with a perspective view of an observer of said object in pixel space, said method comprising the steps of:

(a) calculating one or more planar coefficients from data provided per vertex of said object;

(b) defining a grid of contiguous pixels in said pixel space, said grid having one or more object pixel coordinates;

(c) utilizing said planar coefficients to calculate two or more perspectively correct texture addresses corresponding to one or more pixels at predefined locations associated with said grid, two of said at perspectively correct texture addresses defining a first edge of said grid and at two other perspectively correct texture addresses defining a second edge of said grid;

(d) interpolating between two perspectively corrected texture addresses along said first edge to determine an address per row and a rate of change of a texture address for pixels located along said first edge with respect to a first dimension, and interpolating between two perspectively corrected texture addresses along said second edge to determine an address per row rate of change of a texture address for pixels along said second edge with respect to said first dimension;

(e) for an object pixel to be texture mapped in a given row of said grid, interpolating between a rate of change texture address value with respect to said first dimension of a pixel along said first edge on said row, and a rate of change texture address value with respect to said first dimension of a pixel along said second edge on said row, to determine a texture address rate of change value for said object pixel with respect to said first dimension;

(f) for said object pixel of step (e), interpolating between a texture address value of a pixel along said first edge on said row, and a texture address value of a pixel along said second edge on said row, to determine a pixel address and a texture address rate of change value for said pixel with respect to a second dimension; and (g) computing a level of detail index value for said object pixel from said determined rate of change of a texture address for said pixel with respect to said first and second dimensions.

2. The method of claim 1, further including the step of retrieving a texture address coordinate for said object pixel from a selected texture map selected in accordance with said level of detail index value calculated in step (g).

3. The method of claim 1, wherein one of said perspectively correct texture addresses corresponds to a pixel located at a corner of said grid.

4. An apparatus for rendering texture to an object located on a pixel screen display, each said object to be rendered in accordance with a perspective view of an observer of said object in pixel space, said apparatus comprising:

means for calculating planar coefficients sufficient for creating a perspective projection of a polygonal object in pixel space;

means for locating a grid of contiguous pixels in said pixel space, said grid having one or more object pixel coordinates located therein, said means further utilizing said planar coefficients for calculating two or more perspectively correct texture addresses corresponding to one or more pixels at predefined locations associated with said grid, two of said at perspectively correct texture addresses defining a first edge of said grid and at two other perspectively correct texture addresses defining a second edge of said grid;

first means for interpolating between two perspectively corrected texture addresses along said first edge to determine addresses and a rate of change of a texture address for pixels located along said first edge with respect to a first dimension;

second means for interpolating between two perspectively corrected texture addresses along said second edge to determine addresses and a rate of change of a texture address for pixels along said second edge with respect to said first dimension;

means for determining one or more object pixel locations to be texture mapped within a said grid;

third means for interpolating between a texture address rate of change value with respect to said first dimension of a pixel along said first edge on a said row of said grid having an object pixel, and a texture address rate of change value with respect to said first dimension of a pixel along said second edge on said row, to determine a texture address and address rate of change value for said object pixel with respect to said first dimension;

second means for interpolating between a texture address value of a pixel along said first edge on said row having said object pixel, and a texture address value of a pixel along said second edge on said row, to determine a texture address and address rate of change value for said pixel with respect to a second dimension; and means for computing a level of detail index value for said object pixel from said determined rate of change of a texture address for said pixel with respect to said first and second dimensions.

5. An apparatus according to claim 4 further including means for retrieving texture information to be displayed on said display screen at said object pixel location, said texture information contained in a texture map selected in accordance with said level of detail index value of said object pixel.

6. A method for mapping texture information from a texture space to a computer generated object represented as one or more pixel coordinates (x,y) in a computer image display screen space, said texture space including a plurality of texture maps, with each map having texture information associated with a predefined level of detail, said texture information to be mapped in the form of texels, with each texel represented by a texture address coordinate (u,v), said method comprising:

defining a grid of a predetermined number of pixels, said grid extending in both horizontal and vertical dimensions;

for each of a group of the pixels, 1) calculating a perspectively correct texture address for the pixel, and 2) determining a rate of change of texture addresses, at the pixel, in both the horizontal and vertical directions; and for each of a defined set of pixels, 1) using linear interpolation techniques and using the calculated texture addresses to determine an approximate rate of change of texture addresses, at said each pixel, in both the horizontal and vertical directions, 2) utilizing the determined approximate rate of changes to compute a level of detail index value, and 3) selecting one of the texture maps based on said computed level of detail index value, and utilizing the calculated texture address for the pixel to select one or more texels in the selected texture map for the pixel.

7. The method according to claim 6, wherein said calculating step includes calculating at least one perspectively corrected texture value for a pixel located on one corner of said grid.

8. The method according to claim 7, wherein said calculating step further includes calculating two more perspectively corrected texture addresses ($U_{q,r}$, $V_{q,r}$) for pixels located outside said grid adjacent remaining corners of said grid.

9. The method according to claim 8, wherein said step of calculating perspectively corrected texture addresses (U,V), includes the step of calculating S, T and $W^{-1}$ values representing attribute data associated with an object pixel coordinate X, Y in three dimensional space, said S, T and $W^{-1}$ values defined according to equations:

$$S=Cos=X*Cxs+Y*CyS$$

$$T=Cot+X*Cxt=Y*Cyt$$

$$W=CoW^{-1}=X*CxW^{-1}+Y*CyW^{-1}$$

wherein coefficients Cos, Cxs, Cys, Cot, Cxt, Cyt, $Cow^{-1}$, $Cxw^{-1}$, $Cyw^{-1}$ are computed from given x, y, 1/w, u, and v values associated with each three vertices of a given object polygon, and wherein said u and v address values for each of said three vertices are converted to S and T according to equations:

$$s=u*1/W$$

$$T=V*1/W.$$

10. A method according to claim 6, wherein:
the step of calculating perspectively correct texture addresses includes the steps of calculating perspectively correct texture addresses for two pixels that define a first vertical edge associated with said grid, and for two other pixels that define a second vertical edge associated with said grid; and
the step of using linear interpolation techniques includes the steps of
1) performing a first interpolation to obtain a u and v rate of texture address change with respect to a vertical dimension and intermediate u and v texture addresses along said first vertical edge of said grid,
2) performing a second interpolation to obtain a u and v rate of texture address change with respect to a vertical dimension and intermediate u and v texture addresses along said second vertical edge of said grid,
3) for a given row of said grid, performing a third interpolation to obtain a u and v unit rate of texture address change in a vertical dimension for each intermediate pixel between said first edge and said second edge, and
4) for a given row of said grid, performing a fourth interpolation to obtain a u and v unit rate of texture address change in a horizontal dimension and the intermediate u and v texture addresses between said first edge and said second edge.

11. The method according to claim 10, wherein said step of performing a first interpolation includes the steps of calculating a difference between two u, v coordinate values of two perspectively corrected texture addresses $U_{r,q}V_{r,q}$ associated with two pixels located along said first vertical edge of said grid, and, for a pixel to be mapped, dividing said calculated difference by a value based on a number of intermediate pixels along said first edge to obtain a said rate of change value of a texture address with respect to a unit pixel change in screen space in said vertical dimension for u and v.

12. The method according to claim 11, wherein said dividing step includes dividing by a value based on a number of intermediate pixels along said first edge plus one.

13. The method according to claim 10, wherein said step of performing a second interpolation includes the steps of calculating a difference between two u, v coordinate values of two perspectively corrected texture addresses $U_{r,q}V_{r,q}$ associated with two pixels located along said second vertical edge of said grid, and, for a pixel to be mapped, dividing said calculated difference by a value based on a number of intermediate pixels along said second edge to obtain a said rate of change value of a texture address with respect to a unit pixel change in screen space in said vertical dimension for u and v.

14. The method according to claim 13, wherein said dividing step includes dividing by a value based on a number of intermediate pixels along said first edge plus one.

15. The method according to claim 10, wherein said step of performing a third interpolation includes the step of:
calculating a difference between a rate of change value of a texture address for a pixel located on said first vertical edge and a rate of change value of a texture address for a pixel located on said second vertical edge, and
dividing said difference by a value based on a number of intermediate pixels between said first and second vertical edges to obtain a rate of change value of the vertical texture address rate of change value for each pixel located along a horizontal dimension.

16. The method according to claim 10, wherein said step of performing a fourth interpolation includes the step of:
calculating a difference between a u, v coordinate associated with a pixel located on said row along first vertical edge and a u, v coordinate associated with a pixel located o a row of said second vertical edge; and
dividing said difference by a value based on a number of intermediate pixels in said grid located along said horizontal dimension between said first vertical edge and second vertical edge to obtain a u and v rate of change of texture addresses for pixel locations on said first vertical edge and intermediate of said first vertical edge and second vertical edge in said grid, said rate of change of said texture address calculated with respect to a horizontal dimension.

17. The method according to claim 10, wherein for a pixel in said grid, said interpolated rate of change value of texture address with respect to said vertical dimension approximates $\partial u/\partial y$ representing a rate of change of said texture address coordinate u with respect to said vertical direction, and $\partial v/\partial y$ representing a rate of change of said texture coordinate v with respect to said vertical direction, and said interpolated rate of change value of texture address with respect to said horizontal dimension approximates $\partial u/\partial x$ representing a rate of change of said texture address coordinate u with respect to said horizontal direction, and $\partial v/\partial x$ representing a rate of change of said texture address coordinate v with respect to said horizontal direction.

18. The method according to claim 17, wherein said computing step includes utilizing said $$\frac{\partial u}{\partial x}, \frac{\partial u}{\partial y}, \frac{\partial v}{\partial x}, \frac{\partial v}{\partial y}$$

values to solve an equation $$LOD = \log_2\left[\max\left[\sqrt{\left(\frac{\partial u}{\partial x}\right)^2 + \left(\frac{\partial v}{\partial x}\right)^2} \cdot \sqrt{\left(\frac{\partial u}{\partial y}\right)^2 + \left(\frac{\partial v}{\partial y}\right)^2}\right]\right]$$

where LOD is a level of detail index for said pixel coordinate.

19. A method for mapping texture information from a texture space to a computer generated object represented as one or more pixel coordinates (x,y) in a computer image display screen space, said texture space including a plurality of texture maps, with each map having texture information associated with a predefined level of detail, said texture information to be mapped in the form of texels, with each texel represented by a texture address coordinate (u,v), said method comprising:

defining first and second grids of pixels, each of said grids having a predetermined number of pixels and extending in both horizontal and vertical dimensions, the second grid being located adjacent to the first grid;

for each of a group of pixels of the first grid and for each of a group of pixels of the second grid, 1) calculating a perspectively correct texture address for the pixel, and 2) determining a rate of change of texture addresses, at the pixel, in both the horizontal and vertical directions; and for each of a defined set of pixels of the first grid and for each of a defined set of pixels of the second grid, 1) using linear interpolation techniques and using the calculated texture addresses to determine an approximate rate of change of texture addresses, at said each pixel, in both the horizontal and vertical directions, 2) utilizing the determined approximate rate of changes to compute a level of detail index value, and 3) selecting one of the texture maps based on said computed level of detail index value, and utilizing the calculated texture address for the pixel to select one or more texels in the selected texture map for the pixel.

20. The method according to claim 19, wherein texture address coordinates and a level of detail index value are determined for every pixel of an object to be displayed in pixel space, with each texture address coordinate selected from the selected texture map according to the computed level of detail index value for the pixel.

21. A method according to claim 19, wherein the second grid has corners, and at least some of the pixels of the group of pixels of the second grid are at predefined locations associated with corners of the second grid.

22. A method according to claim 19, wherein:

the group of pixels of the first grid comprise a first group of pixels;

the group of pixels of the second grid comprise a second group of pixels; and for at least one of the pixels of the second group of pixels, the step of calculating a perspectively correct texture address includes the step of using the texture address calculated for one of the pixels of the first group of pixels to calculate the perspectively correct texture address for said at least one of the pixels of the second group.

23. A method according to claim 19, wherein:

the defined set of pixels of the first grid comprise a first set of pixels;

the defined set of pixels of the second grid comprise a second set of pixels;

for at least one of the pixels of the second set of pixels, the stepof using the calculated texture addresses includes the step of using the texture address calculated for one of the pixels of the first set of pixels to determine an approximate rate of change of texture addresses at said at least one of the pixels of the second set of pixels.

* * * * *

UNITED STATES PATENT AND TRADEMARK OFFICE
CERTIFICATE OF CORRECTION

PATENT NO. : 6,639,598 B2
DATED : October 28, 2003
INVENTOR(S) : Piazza et al.

It is certified that error appears in the above-identified patent and that said Letters Patent is hereby corrected as shown below:

Column 17,
Line 15, equation, delete "$W = CoW^{-1}$" and insert -- $W^{-1} = CoW^{-1}$ --.

Signed and Sealed this

Twenty-fourth Day of August, 2004

JON W. DUDAS
*Director of the United States Patent and Trademark Office*